United States Patent
Fujita et al.

(10) Patent No.: US 11,769,886 B2
(45) Date of Patent: Sep. 26, 2023

(54) BATTERY CELL, CELL STACK, AND REDOX FLOW BATTERY

(71) Applicant: SUMITOMO ELECTRIC INDUSTRIES, LTD., Osaka (JP)

(72) Inventors: Hayato Fujita, Osaka (JP); Masahiro Kuwabara, Osaka (JP)

(73) Assignee: SUMITOMO ELECTRIC INDUSTRIES, LTD., Osaka (JP)

(*) Notice: Subject to any disclaimer, the term of this patent is extended or adjusted under 35 U.S.C. 154(b) by 98 days.

(21) Appl. No.: 17/425,194

(22) PCT Filed: Jan. 24, 2020

(86) PCT No.: PCT/JP2020/002596
§ 371 (c)(1),
(2) Date: Jul. 22, 2021

(87) PCT Pub. No.: WO2020/158624
PCT Pub. Date: Aug. 6, 2020

(65) Prior Publication Data
US 2022/0093942 A1    Mar. 24, 2022

(30) Foreign Application Priority Data
Jan. 30, 2019  (JP) .................................. 2019-014461

(51) Int. Cl.
*H01M 8/0263*     (2016.01)
*H01M 8/2418*     (2016.01)
(Continued)

(52) U.S. Cl.
CPC ....... *H01M 8/0263* (2013.01); *H01M 4/8631* (2013.01); *H01M 8/026* (2013.01); *H01M 8/188* (2013.01); *H01M 8/2418* (2016.02)

(58) Field of Classification Search
CPC .. H01M 8/0263; H01M 8/2418; H01M 8/026; H01M 8/188; H01M 4/8631
See application file for complete search history.

(56) References Cited

U.S. PATENT DOCUMENTS

| 7,491,459 B2 | 2/2009 | Kusakabe et al. |
| 2018/0151892 A1 | 5/2018 | Hwang et al. |

(Continued)

FOREIGN PATENT DOCUMENTS

| CN | 206163611 U | 5/2017 | |
| CN | 206758557 U * | 12/2017 | .......... H01M 8/0258 |

(Continued)

OTHER PUBLICATIONS

U.S. Appl. No. 17/425,098, filed Jul. 22, 2021 in the name of Hayato Fujita et al.
Feb. 22, 2023 Office Action Issued in U.S. Appl. No. 17/425,098.

*Primary Examiner* — Karie O'Neill Apicella
(74) *Attorney, Agent, or Firm* — Oliff PLC

(57) ABSTRACT

A battery cell that has a supply edge to which an electrolyte solution is supplied and a discharge edge from which the electrolyte solution is discharged has an introduction port that connects with the supply edge and a discharge port that connects with the discharge edge, and includes a plurality of meandering flow paths each of which is serially formed from the introduction port to the discharge port, the plurality of meandering flow paths being arranged in parallel in a widthwise direction. Each of the meandering flow paths has an introduction-side section extending from the introduction port toward a discharge edge side, a turn-back section that is turned back from an end portion on the discharge edge side of the introduction-side section toward a supply edge side, and a discharge-side section reaching the discharge port from an end portion on the supply edge side of the turn-back section.

12 Claims, 5 Drawing Sheets

(51) Int. Cl.
*H01M 4/86* (2006.01)
*H01M 8/026* (2016.01)
*H01M 8/18* (2006.01)

(56) References Cited

U.S. PATENT DOCUMENTS

2018/0375115 A1   12/2018  Kanno et al.
2020/0067107 A1   2/2020   Nakaishi et al.

FOREIGN PATENT DOCUMENTS

| | | |
|---|---|---|
| CN | 206758557 U | 12/2017 |
| JP | 2015-122231 A | 7/2015 |
| JP | 2015-138771 A | 7/2015 |
| WO | 2013/139247 A1 | 9/2013 |
| WO | 2015/082614 A1 | 6/2015 |
| WO | 2018/069996 A1 | 4/2018 |
| WO | 2018/105155 A1 | 6/2018 |

* cited by examiner

BATTERY CELL, CELL STACK, AND REDOX FLOW BATTERY

TECHNICAL FIELD

The present disclosure relates to a battery cell, a cell stack, and a redox flow battery.

The present application claims priority based on Japanese Patent Application No. 2019-014461 filed on Jan. 30, 2019, the entire contents of which are incorporated herein by reference.

BACKGROUND ART

Redox flow batteries are known as a type of large-capacity storage battery (see Patent Documents 1 and 2). In the following, a redox flow battery may be called an "RF battery". A main constituent element of the RF battery is a battery cell that includes a positive electrode, a negative electrode, and a membrane interposed between these electrodes. Commonly, a stacked body that includes a plurality of battery cells called a cell stack is used in the RF battery. The cell stack has a structure in which a cell frame, the positive electrode, the membrane, and the negative electrode are repeatedly stacked in this order. Each cell frame includes a bipolar plate that is arranged between a positive electrode and a negative electrode, and a frame member that is provided at an outer periphery of the bipolar plate. In the cell stack, the positive and negative electrodes are arranged opposing each other with the membrane therebetween, between bipolar plates of adjacent cell frames, thereby forming one battery cell. Electrolyte solutions are supplied to the battery cell, the battery reaction is caused at the electrodes, and the electrolyte solutions after subjected to the reaction is discharged from the battery cell.

Patent Documents 1 and 2 discloses bipolar plates each of which has a flow path for an electrolyte solution to flow on a face on an electrode side of the bipolar plate. The face on the electrode side of the bipolar plate is a face opposing an electrode. Patent Documents 1 and 2 describe flow paths each of which has a meandering shape, as the flow paths for the electrolyte solution to flow (see paragraphs 0041 and 0042 and FIG. 5 in Patent Document 1, and paragraph 0061 and FIG. 5 in Patent Document 2).

CITATION LIST

Patent Documents

Patent Document 1: JP 2015-122231A
Patent Document 2: JP 2015-138771A

SUMMARY OF INVENTION

A battery cell of the present disclosure is
a battery cell that includes an electrode and a bipolar plate arranged opposing the electrode, and has a supply edge to which an electrolyte solution is supplied, and a discharge edge from which the electrolyte solution is discharged, in a plan view from a direction in which the electrode and the bipolar plate overlap each other, the battery cell including:
a plurality of meandering flow paths each of which has an introduction port that is in connection with the supply edge, and a discharge port that is in connection with the discharge edge, and is serially formed from the introduction port to the discharge port, the plurality of meandering flow paths being arranged in parallel in a widthwise direction,
each of the meandering flow paths having:
an introduction-side section extending from the introduction port toward a discharge edge side, and having an end portion on the discharge edge side;
a turn-back section that is turned back from the end portion on the discharge edge side of the introduction-side section toward a supply edge side, and has an end portion on the supply edge side; and
a discharge-side section extending from the end portion on the supply edge side of the turn-back section toward the discharge edge side, and reaching the discharge port,
wherein a length in a lengthwise direction of a region in which the introduction-side section, the turn-back section, and the discharge-side section are arranged in the widthwise direction is 100 mm or more and 2000 mm or less, and
the lengthwise direction is a direction from the supply edge toward the discharge edge, and the widthwise direction is a direction parallel to the supply edge and the discharge edge.

A cell stack of the present disclosure includes the battery cell of the present disclosure.

A redox flow battery of the present disclosure includes the cell stack of the present disclosure.

Another redox flow battery of the present disclosure includes the battery cell of the present disclosure.

DESCRIPTION OF EMBODIMENTS

Figure 1:
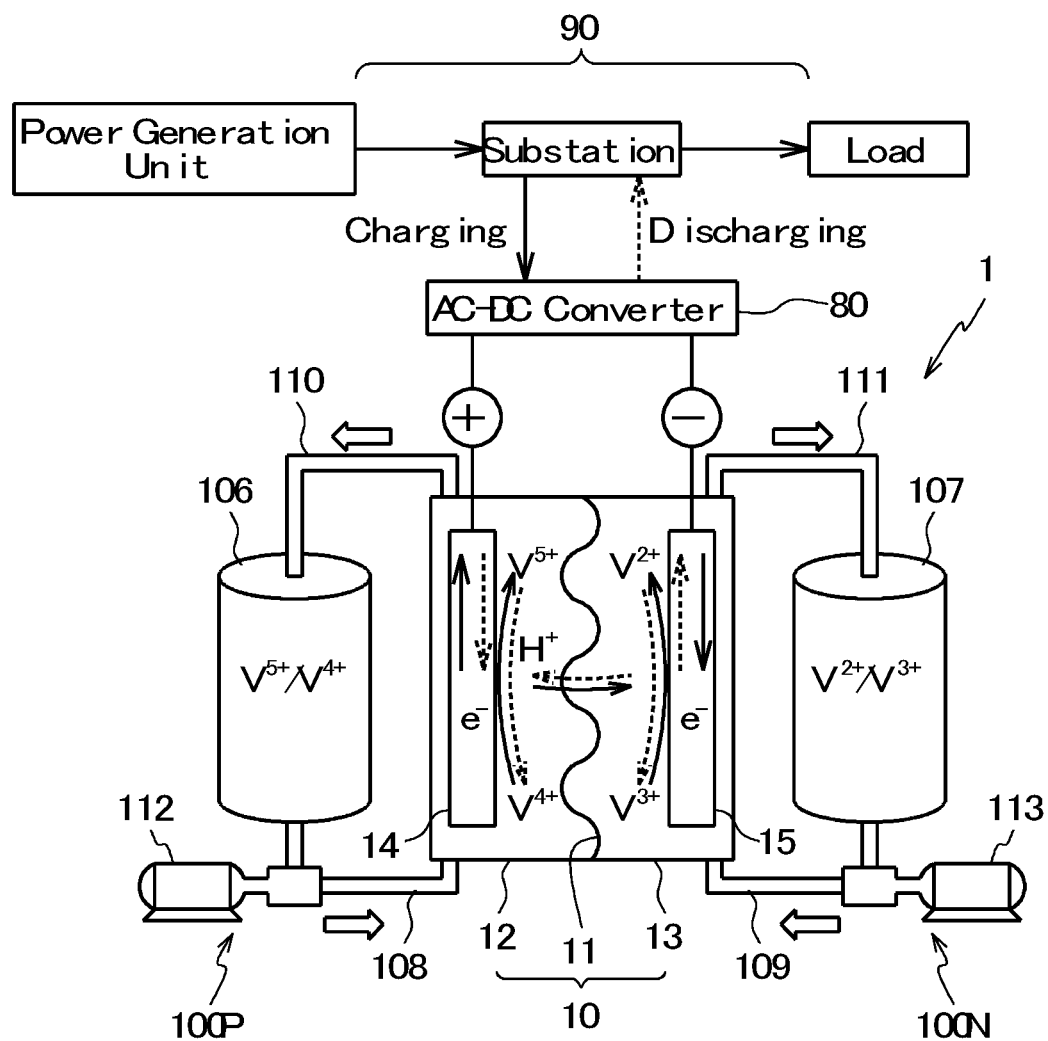
FIG. 1 is an explanatory diagram illustrating an operating principle of a redox flow battery according to an embodiment.

Problem to be Solved by the Present Disclosure

Further improvement of battery performance of RF batteries is desired, and there is a demand for increasing energy efficiency. In particular, it is required to enable an electrolyte solution to flow over a wide area of each electrode while reducing pressure loss of the electrolyte solution.

Patent Documents 1 and 2 disclose bipolar plates in which flow paths that have a meandering shape are formed. The flow paths that have a meandering shape described in Patent Documents 1 and 2 are serially formed throughout the bipolar plates. These flow paths enable electrolyte solutions to uniformly spread throughout the bipolar plates. Meanwhile, the entire lengths of the flow paths elongate, the flow resistance of the electrolyte solutions increases as much, and there is, therefore, a concern that the pressure loss increases when the electrolyte solutions are passed through the flow paths. If the pressure loss of the electrolyte solutions is large, the power for pumps for sending the electrolyte solutions needs to be increased, and thus, there may be cases where the energy efficiency of the RF battery decreases. Therefore, conventionally, reducing the pump power of RF batteries has not necessarily been sufficiently studied.

An object of the present disclosure is to provide a battery cell capable of reducing the pump power of a redox flow battery. Another object of the present disclosure is to provide a cell stack capable of improving battery performance of a redox flow battery. Further, yet another object of the present disclosure is to provide a redox flow battery with excellent battery performance.

Effects of the Present Disclosure

The battery cell of the present disclosure can reduce the pump power of a redox flow battery. Further, the cell stack of the present disclosure can improve battery performance of a redox flow battery. The redox flow battery of the present disclosure has excellent battery performance.

Description of Embodiment of the Present Disclosure

Firstly, embodiments for carrying out the present disclosure will be listed.

(1) A battery cell according to an aspect of the present disclosure is a battery cell that includes an electrode and a bipolar plate arranged opposing the electrode, and has a supply edge to which an electrolyte solution is supplied, and a discharge edge from which the electrolyte solution is discharged, in a plan view from a direction in which the electrode and the bipolar plate overlap each other, the battery cell including:

a plurality of meandering flow paths each of which has an introduction port that is in connection with the supply edge, and a discharge port that is in connection with the discharge edge, and is serially formed from the introduction port to the discharge port, the plurality of meandering flow paths being arranged in parallel in a widthwise direction, each of the meandering flow paths having:
an introduction-side section extending from the introduction port toward a discharge edge side, and having an end portion on the discharge edge side;
a turn-back section that is turned back from the end portion on the discharge edge side of the introduction-side section toward a supply edge side, and has an end portion on the supply edge side; and
a discharge-side section extending from the end portion on the supply edge side of the turn-back section toward the discharge edge side, and reaching the discharge port, wherein a length in a lengthwise direction of a region in which the introduction-side section, the turn-back section, and the discharge-side section are arranged in the widthwise direction is 100 mm or more and 2000 mm or less, and the lengthwise direction is a direction from the supply edge toward the discharge edge, and the widthwise direction is a direction parallel to the supply edge and the discharge edge.

Since the battery cell of the present disclosure includes the plurality of meandering flow paths, the electrolyte solution can be allowed to flow over a wide area of the electrode along each meandering flow path. Further, since the battery cell of the present disclosure includes the plurality of meandering flow paths, rather than one meandering flow path as in the conventional battery cell, the entire length of each meandering flow path is shorter than that in the case where one meandering flow path is provided. For this reason, in the battery cell of the present disclosure, the pressure loss can be reduced when the electrolyte solution is passed through the meandering flow paths. Accordingly, the battery cell of the present disclosure can reduce the pump power of an RF battery.

Furthermore, since the length of the region in which the introduction-side section, the turn-back section, and the discharge-side section are arranged in the widthwise direction is 100 mm or more, the electrolyte solution can be easily diffused into a wide area of the electrode. In the following, the region in which the aforementioned sections are arranged in the widthwise direction may be referred to as a "parallel arrangement region". Thus, according to the aspect, the battery reaction can be easily caused in the electrode. Since the length of the parallel arrangement region is 2000 mm or less, excessive lengthening of the entire length of the meandering flow paths can be avoided. For this reason, according to the aspect, the flow resistance of the electrolyte solution in the meandering flow paths can be reduced, and thus, the pressure loss of the electrolyte solution can be easily reduced. According to the aspect, the pump power can be more easily reduced.

(2) As an embodiment of the above battery cell,
a distance in the widthwise direction between the introduction-side section and the turn-back section and a distance in the widthwise direction between the discharge-side section and the turn-back section may be each 1 mm or more and 36 mm or less.

Since the distance between the introduction-side section and the turn-back section and the distance between the discharge-side section and the turn-back section are in the above range, the diffusion of the electrolyte solution into the electrode can be improved. According to the embodiment, the battery reaction can be efficiently caused.

(3) As an embodiment of the above battery cell,
a cross-sectional area of each of the meandering flow paths may be uniform over an entire length from the introduction port to the discharge port.

Since the cross-sectional area of each meandering flow path is uniform over the entire length, the flow rate of the electrolyte solution can be easily kept constant over the entire length of the meandering flow path.

(4) As an embodiment of the above battery cell,
a cross-sectional area of each of the meandering flow paths may be 0.5 mm$^2$ or more and 16 mm$^2$ or less.

Since the cross-sectional area of each meandering flow path is in the above range, the flow rate of the electrolyte solution flowing through the meandering flow path can be easily secured sufficiently, and the electrolyte solution can be easily spread over a wide area of the electrode. Thus, in this embodiment, the battery reaction can be easily caused in the electrode. Further, if the cross-sectional area of each meandering flow path is in the above range, the flow resistance of the electrolyte solution in the meandering flow path can be reduced, and thus, the pressure loss of the electrolyte solution can be easily reduced. According to the embodiment, the pump power can be more easily reduced.

(5) As an embodiment of the above battery cell,
an entire length of each of the meandering flow paths may be 300 mm or more and 6000 mm or less.

Since the entire length of each meandering flow path is 300 mm or more, the electrolyte solution can be easily diffused into a wide area of the electrode. Thus, in this embodiment, the battery reaction can be easily caused in the electrode. Since the entire length of each meandering flow path is 6000 mm or less, the flow resistance of the electrolyte solution in the meandering flow path can be sufficiently reduced, and thus, the pressure loss of the electrolyte solution can be easily reduced sufficiently. According to the embodiment, the pump power can be easily reduced sufficiently.

(6) As an embodiment of the above battery cell, the meandering flow paths may be formed on the bipolar plate.

The meandering flow paths are preferably formed on at least one of the bipolar plate and the electrode. A flow path can be easily formed on the bipolar plate. For this reason, according to the embodiment, the meandering flow paths can be easily formed. The meandering flow paths may alternatively be formed on the electrode.

(7) As an embodiment of the above battery cell, each of the meandering flow paths may include a groove.

Since each meandering flow path includes a groove, the electrolyte solution can be more easily flow through the meandering flow path. For this reason, according to the embodiment, the pressure loss of the electrolyte solution can be more easily reduced. According to the embodiment, the pump power can be more easily reduced. If the meandering flow paths are formed on the electrode, each meandering flow path may be constituted by a groove, or may alternatively be constituted by a non-dense portion in which the porosity of a porous body itself that constitutes the electrode is locally large. A groove and a non-dense portion with a large porosity of the porous body allow the electrolyte solution to more easily flow than a portion without a groove and a dense portion with a small porosity, and function as flow paths.

(8) As an embodiment of the above battery cell, a permeability of the electrode may be $1\times10^{-13}$ m$^2$ or more and $1\times10^{-10}$ m$^2$ or less.

The permeability of the electrode is an index that indicates ease of the flowing of the electrolyte solution through the electrode. A higher permeability indicates that the electrolyte solution can more easily flow through the electrode. Since the permeability is in the above range, the pressure loss of the electrolyte solution flowing through the electrode can be further reduced. Further, if the permeability is in the above range, the electrolyte solution can easily diffuse into the electrode, and the electrolyte solution can be easily spread over a wide area of the electrode. For this reason, according to the embodiment, the battery reaction easily occurs in the electrode.

(9) As an embodiment of the above battery cell, the turn-back section may have:

one vertical section arranged between the introduction-side section and the discharge-side section; and two lateral sections, one of the two lateral sections connecting end portions on the discharge edge side of the introduction-side section and of the vertical section to each other, and the other one of the two lateral sections connecting end portions on the supply edge side of the discharge-side section and of the vertical section to each other.

According to the embodiment, the meandering flow path can be formed.

(10) A cell stack according to an aspect of the present disclosure includes the battery cell described in any one of the above items (1) to (9).

The cell stack of the present disclosure enables the electrolyte solution to flow over a wide area of the electrode while being able to reduce the pressure loss of the electrolyte solution. For this reason, the cell stack of the present disclosure can reduce the pump power of an RF battery. This is because the cell stack of the present disclosure includes the above-described battery cell of the present disclosure. Accordingly, the cell stack of the present disclosure can improve battery performance of an RF battery.

(11) A redox flow battery according to an aspect of the present disclosure includes the cell stack described in the above item (10).

(12) A redox flow battery according to another aspect of the present disclosure includes the battery cell described in any one of the above items (1) to (9).

Since the RF battery of the present disclosure includes the above-described battery cell of the present disclosure or the above-described cell stack of the present disclosure, the pump power can be reduced. Accordingly, the RF battery of the present disclosure has excellent battery performance.

Details of Embodiments of the Present Disclosure

Specific examples of a battery cell, a cell stack, and a redox flow battery (RF battery) according to an embodiment of the present disclosure will be described below with reference to the drawings. The same reference numerals in the diagrams denote the same or corresponding parts. The present invention is defined by the terms of the claims, but not limited to the above description, and is intended to include any modifications within the meaning and scope equivalent to the terms of the claims.

Embodiment

An example of an RF battery 1, and a battery cell 10 and a cell stack 2 that are provided in the RF battery cell 1 according to the embodiment will be described with reference to FIGS. 1 to 6.

RF Battery

Figure 2:
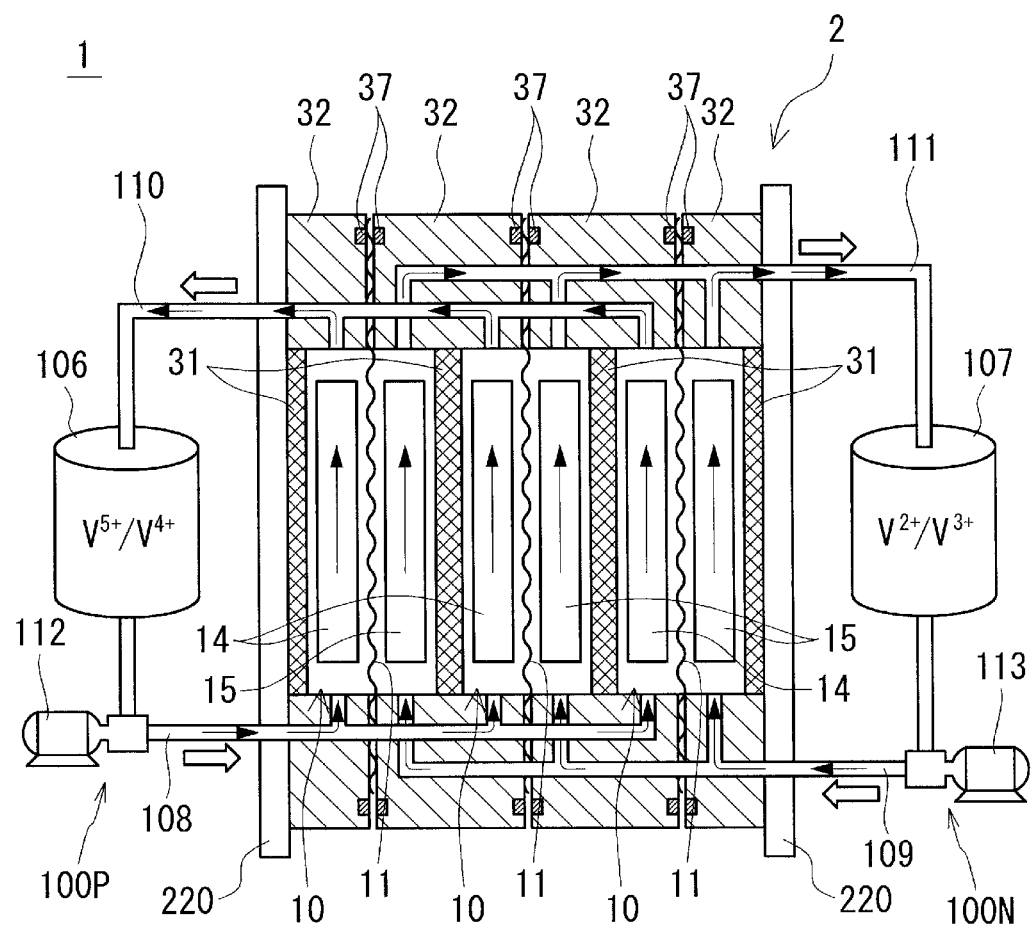
FIG. 2 is a schematic configuration diagram showing an example of the redox flow battery according to the embodiment.

The RF battery 1 shown in FIGS. 1 and 2 uses electrolyte solutions each of which contains, as an active material, metal ions whose valence changes due to redox, as a positive electrolyte solution and a negative electrolyte solution. The RF battery 1 is charged and discharged using a difference between the redox potential of ions contained in the positive electrolyte solution and the redox potential of ions contained in the negative electrolyte solution. Here, a vanadium-based RF battery that uses vanadium electrolyte solutions containing vanadium (V) ions as the positive electrolyte solution and the negative electrolyte solution is shown as an example of the RF battery 1. In the battery cell 10 in FIG. 1, solid arrows indicate a charge reaction, and dashed arrows indicate a discharge reaction. The RF battery 1 is connected to a power grid 90 via an AC-DC converter 80. For example, the RF battery 1 is used for the purposes of load leveling, instantaneous voltage drop compensation and emergency power supply, as well as output smoothing for natural energy power generation, such as solar power generation and wind power generation. The RF battery 1 may alternatively be, for example, a manganese-titanium-based RF battery in which the positive electrolyte solution contains manganese ions and the negative electrolyte solution contains titanium ions. Any electrolyte solution with a known composition can be used.

The RF battery 1 includes a battery cell 10 that is charged and discharged, tanks 106 and 107 for storing the electrolyte solutions, and circulation paths 100P and 100N for circulating the electrolyte solutions between the tanks 106 and 107 and the battery cell 10.

Battery Cell

As shown in FIG. 1, the battery cell 10 includes a positive electrode 14, a negative electrode 15, and a membrane 11 that is interposed between these two electrodes. The structure of the battery cell 10 is separated into a positive electrode cell 12 and a negative electrode cell 13 with the membrane 11 therebetween, and the positive electrode 14 and the negative electrode 15 are contained in the positive electrode cell 12 and the negative electrode cell 13, respectively. As shown in FIG. 2, the battery cell 10 is configured such that the positive electrode 14 and the negative electrode 15 are arranged opposing each other via the membrane 11 between the bipolar plates 31 (also see FIG. 3).

Figure 5:
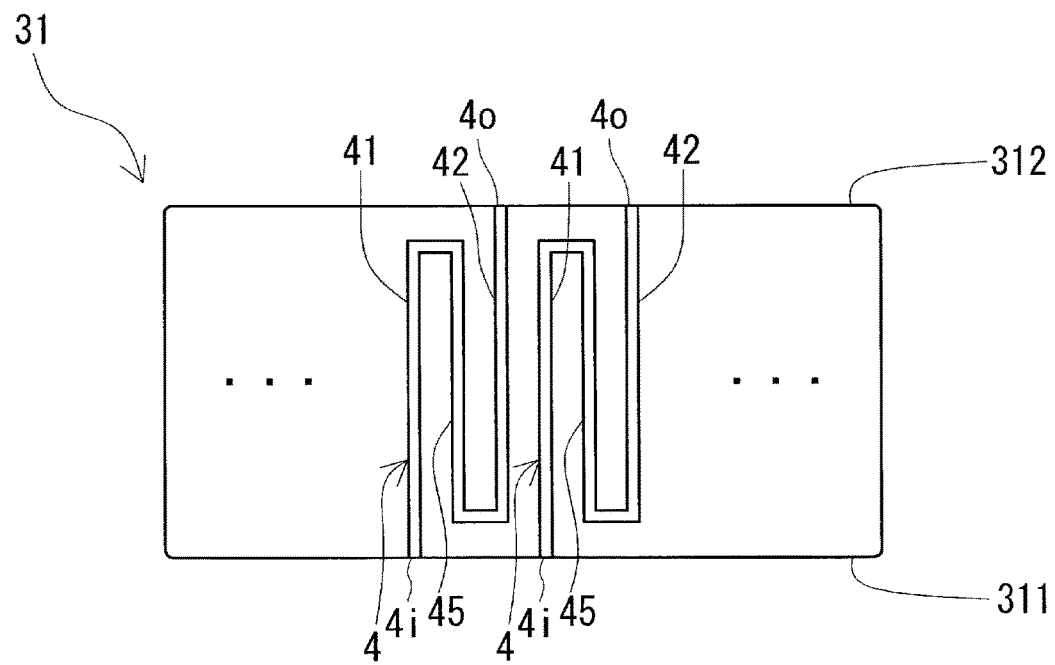
FIG. 5 is a schematic plan view of a bipolar plate provided in a battery cell according to the embodiment as viewed from one face side.
Figure 6:
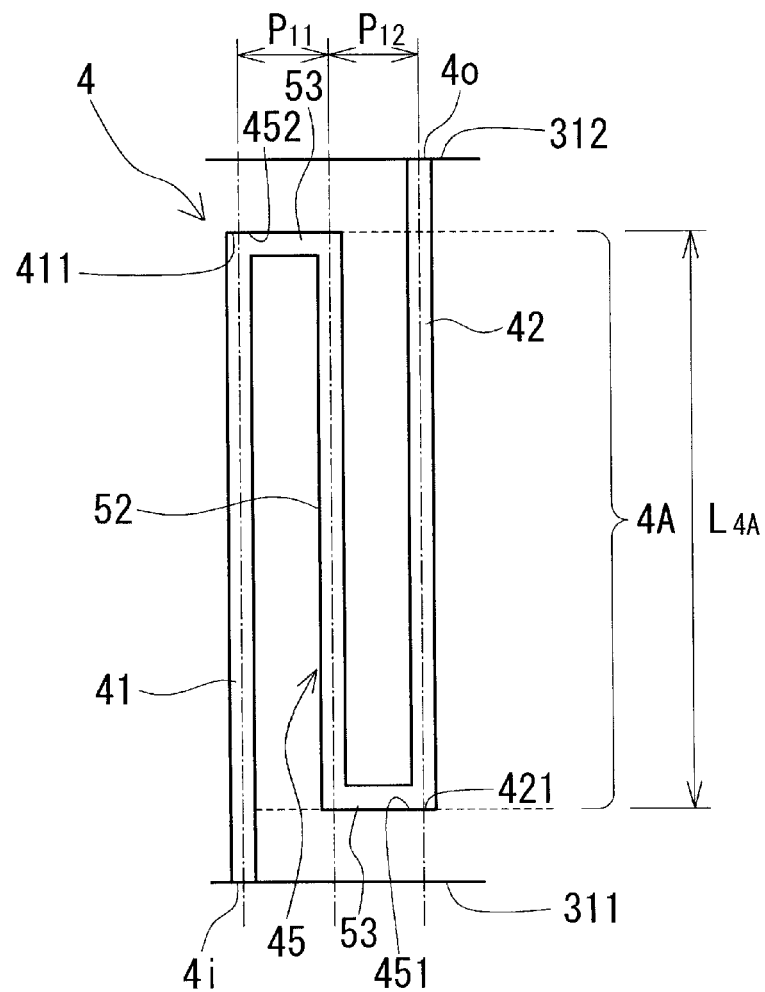
FIG. 6 is a schematic enlarged plan view showing a meandering flow path in the battery cell according to the embodiment.

As shown in FIG. 5, the battery cell 10 of the embodiment has a supply edge 311 to which the electrolyte solutions are supplied, and a discharge edge 312 from which the electrolyte solutions are discharged. The battery cell 10 includes a plurality of meandering flow paths 4 as flow paths for the electrolyte solutions to flow. For example, the meandering flow paths 4 are formed on at least either the electrodes, namely the positive electrode 14 and the negative electrode 15, or the bipolar plate 31. In the embodiment, the plurality of meandering flow paths 4 are formed on the bipolar plate 31. As shown in FIG. 6, each meandering flow path 4 has an introduction-side section 41, a turn-back section 45, and a discharge-side section 42. One of the characteristics of the meandering flow paths 4 lies in that, when the direction from the supply edge 311 toward the discharge edge 312 is regarded as a lengthwise direction, and the direction parallel to the supply edge 311 and the discharge edge 312 is regarded as a widthwise direction, the length in the lengthwise direction of a parallel arrangement region 4A in which the introduction-side section 41, the turn-back section 45, and the discharge-side section 42 are arranged in the widthwise direction is 100 mm or more and 2000 mm or less. The aforementioned length of the parallel arrangement region 4A refers to the length denoted by $L_{4A}$ in FIG. 6. In the following, a basic configuration of the battery cell 10 will be described first, and then a configuration of the meandering flow paths 4 provided in the battery cell 10 will be described with reference to FIGS. 5 and 6.

Electrode

The electrolyte solutions, namely the positive electrolyte solution and the negative electrolyte solution are supplied respectively to the positive electrode 14 and the negative electrode 15 of the RF battery 1. Each electrode functions as a reaction field where the corresponding electrolyte solution carries out the battery reaction. The positive electrode 14 and the negative electrode 15 are each formed with an electrically conductive porous body. Since the electrodes formed with a porous body have holes, the electrolyte solutions are enabled to flow within the electrode. For example, carbon felt, carbon cloth, carbon paper, or the like can be preferably used as the positive electrode 14 and the negative electrode 15. The membrane 11 is formed with, for example, an ion exchange membrane that allows hydrogen ions to pass through it.

Permeability of Electrodes

The permeability of the electrodes, namely the positive electrode 14 and the negative electrode 15 may be, for example, $1 \times 10^{-13}$ m$^2$ or more and $1 \times 10^{-10}$ m$^2$ or less. The permeability is an index indicating ease of the flowing of the electrolyte solution. A higher permeability indicates that the electrolyte solutions can more easily flow through the electrodes. With a permeability of $1 \times 10^{-13}$ m$^2$ or more, the flow resistance of the electrolyte solution in the electrodes decreases, and the pressure loss of the electrolyte solutions flowing through the electrodes can be further reduced. Further, if the permeability is $1 \times 10^{-13}$ m$^2$ or more, the electrolyte solutions can easily diffuse into the electrodes, the electrolyte solutions can be easily spread over a wide area of each electrode. If the permeability is too high, the proportion of the electrolyte solutions that pass through the electrodes without carrying out the battery reaction increases. As a result, the battery reaction is less likely to occur in the electrodes. Since the permeability is $1 \times 10^{-10}$ m$^2$ or less, the electrolyte solutions that pass through the electrodes without reacting can be reduced. Accordingly, the battery reaction is more likely to occur in the electrodes. A more preferable permeability of the electrodes is $2 \times 10^{-13}$ m$^2$ or more, and furthermore, $5 \times 10^{-13}$ m$^2$ or more and $5 \times 10^{-11}$ m$^2$ or less.

The permeability is the reciprocal of the permeability resistance of the electrodes, and is obtained by the Darcy-Weisbach equation shown as the following equation.

$$\Delta P = (h/K)\mu(Q/wd)$$

K denotes the permeability (m$^2$). $\Delta P$ denotes a pressure loss (Pa), Q denotes a flow rate (m$^3$/s) of a fluid supplied to each electrode, $\mu$ denotes a viscosity (Pa·s) of the fluid, h denotes a length (m) of the electrode, w denotes a width (m) of the electrode, and d denotes the thickness (m) of the electrode. The thickness of the electrode is that in a compressed state when the electrode is incorporated into the battery cell 10. The permeability is a value unique to the electrode regardless of the type of fluid. The permeability is a constant that can be measured using a fluid that has a known viscosity, such as water. The permeability of the electrode can be obtained using a measurement method described in Patent Document 1.

In the positive electrode cell 12 and the negative electrode cell 13 that constitute the battery cell 10, the electrolyte solutions, namely the positive electrolyte solution and the negative electrolyte solution circulate through the circulation paths 100P and 100N, as shown in FIGS. 1 and 2. The positive electrolyte solution tank 106 for storing the positive electrolyte solution is connected to the positive electrode cell 12 via the positive electrode circulation path 100P. Similarly, the negative electrolyte solution tank 107 for storing the negative electrolyte solution is connected to the negative electrode cell 13 via the negative electrode circulation path 100N. The circulation paths 100P and 100N respectively have supply pipes 108 and 109 for feeding the electrolyte solutions from the respective tanks 106 and 107 to the battery cell 10, and return pipes 110 and 111 for returning the electrolyte solutions from the battery cell 10 to the respective tanks 106 and 107. The supply pipes 108 and 109 are provided with pumps 112 and 113, respectively, for pumping the electrolyte solutions stored in the respective tanks 106 and 107. The electrolyte solutions are circulated in the battery cell 10 by these pumps 112 and 113.

Cell Stack

Figure 3:
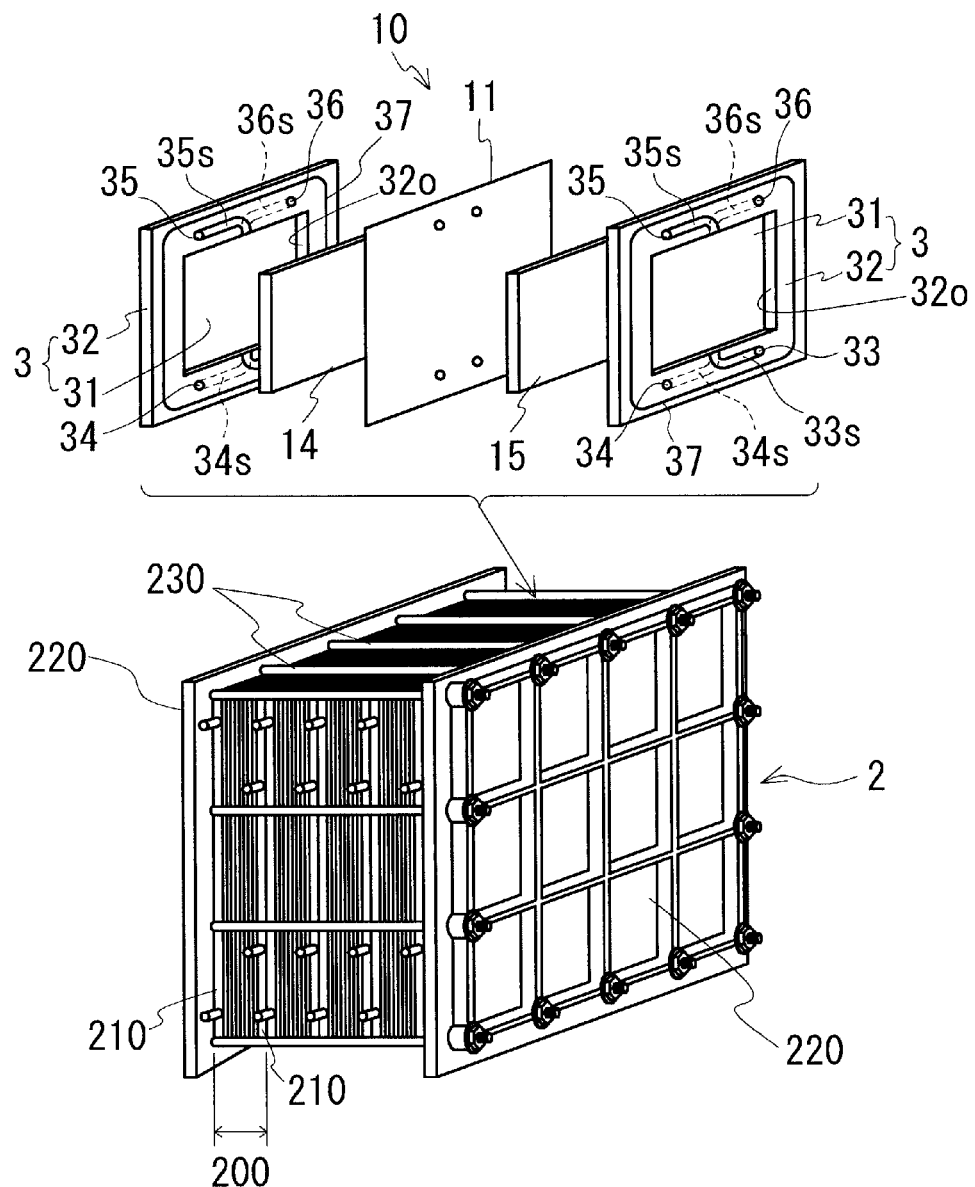
FIG. 3 is a schematic configuration diagram showing an example of a cell stack according to the embodiment.

The RF battery 1 may be a single cell battery that includes a single battery cell 10, or may be a multi-cell battery that includes a plurality of battery cells 10. In the RF battery 1, commonly, the cell stack 2 in which a plurality of battery cells 10 are stacked, such as that shown in FIG. 2, is used. As shown in FIG. 3, the cell stack 2 is configured by sandwiching a plurality of sub stacks 200 from two opposite sides by two end plates 220, and tightening the end plates 220 on the two opposite sides with tightening mechanisms 230. FIG. 3 shows the cell stack 2 that includes the plurality of sub stacks 200. Each sub stack 200 has a structure in which the cell frame 3, the positive electrode 14, the membrane 11, and the negative electrode 15 are repeatedly stacked in that order, and supply/discharge plates 210 are arranged at the two opposite ends of the stacked body. The supply pipes 108 and 109 and the return pipes 110 and 111 of the circulation paths 100P and 100N (see FIGS. 1 and 2) are connected to the supply/discharge plates 210.

Cell Frame

Figure 4:
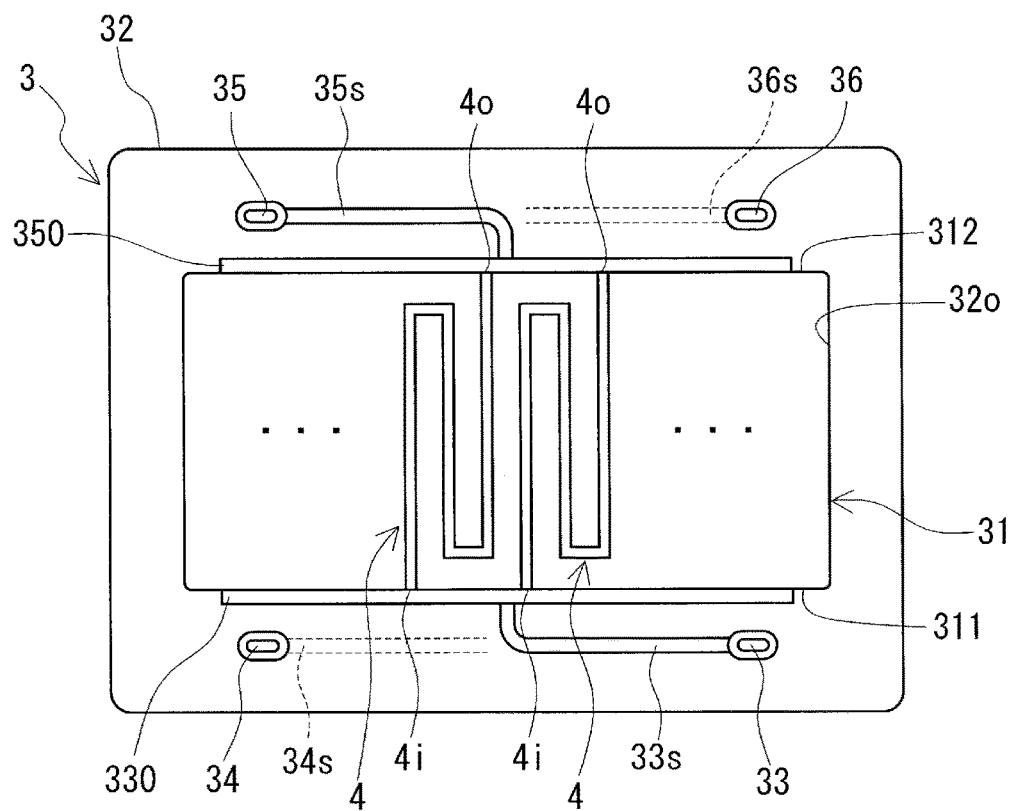
FIG. 4 is a schematic plan view of a cell frame provided in the cell stack according to the embodiment as viewed from one face side.

As shown in FIG. 3, each cell frame 3 has the bipolar plate 31 that is arranged between the positive electrode 14 and the negative electrode 15, and a frame member 32 that is located around the bipolar plate 31 (also see FIG. 4). The positive electrode 14 is arranged on one face side of the bipolar plate 31 in an opposing manner. The negative electrode 31 is arranged on the other face side of the bipolar plate 15 in an opposing manner. The bipolar plate 31 is located within the frame member 32, and recessed portions 32o are formed by the bipolar plate 31 and the frame member 32. The recessed portions 32o are formed on the two sides of the bipolar plate 31, and the positive electrode 14 and the negative electrode 15 are accommodated in the respective recessed portions 32o with the bipolar plate 31 therebetween.

The bipolar plate 31 is formed with, for example, conductive plastic, typically plastic carbon or the like. Plastic carbon is a composite material of conductive carbon and resin. The frame member 32 is formed with plastic such as vinyl chloride resin (PVC), polypropylene, polyethylene, fluororesin, or epoxy resin, for example. The cell frame 3 may be manufactured by integrating the bipolar plate 31 with the frame member 32 therearound, by means of injection molding or the like. In addition, the cell frame 3 can also be manufactured by arranging a sealing member between an outer peripheral portion of the bipolar plate 31 and an inner peripheral portion of the frame member 32 and overlapping the outer peripheral portion of the bipolar plate 31 and the inner peripheral portion of the frame member 32.

In each sub stack 200 that constitutes the cell stack 2, one face side and the other face side of the frame members 32 of adjacent cell frames 3 oppose each other, and one battery cell 10 is formed between the bipolar plates 31 of the adjacent cell frames 3 (see FIG. 3). In other words, the bipolar plate 31 is interposed between adjacent battery cells 10. The electrodes, namely the positive electrode 14 and the negative electrode 15 are accommodated in the respective recessed portions 32o of the frame bodies 32 when a battery cell 10 is formed. Ring-shaped seal members 37 (see FIGS. 2 and 3), such as O rings or flat packings, are arranged between the frame members 32 of the cell frames 3 in order to suppress leakage of the electrolyte solutions.

The electrolyte solutions are supplied to and discharged from the battery cell 10 via supply manifolds 33 and 34 and discharge manifolds 35 and 36 that are formed through the frame member 32, and supply slits 33s and 34s and discharge slits 35s and 36s that are formed in the frame member 32. In the case of the cell frame 3 shown in FIG. 3, the positive electrolyte solution is supplied from the supply manifold 33 formed at a lower portion of the frame member 32 to one face side of the bipolar plate 31 via the supply slit 33s formed on the one face side of the frame member 32. The supplied positive electrolyte solution is discharged to the discharge manifold 35 via the discharge slit 35s formed at an upper portion of the frame member 32. Similarly, the negative electrolyte solution is supplied from the supply manifold 34 formed at a lower portion of the frame member 32 to the other face side of the bipolar plate 31 via the supply slit 34s formed on the other face side of the frame member 32. The supplied negative electrolyte solution is discharged to the discharge manifold 36 via the discharge slit 36s formed at an upper portion of the frame member 32. The supply manifolds 33 and 34 and the discharge manifolds 35 and 36 are connected, respectively, to the supply pipes 108 and 109 and the return pipes 110 and 111 of the circulation paths 100P and 100N (see FIGS. 1 and 2) via the supply/discharge plate 210 (see FIG. 3).

The battery cell 10 in this example is configured such that the electrolyte solutions are supplied from the lower edge side and discharged from the upper edge side. That is to say, the electrolyte solutions flow in the battery cell 10 in an upward direction of the paper, as a whole.

As shown in FIG. 4, each cell frame 3 has a supply-side straightening portion 330 and a discharge-side straightening portion 350. The supply-side straightening portion 330 is a groove that is formed on one face side of the frame member 32 and extends along an inner-peripheral lower edge of the frame member 32. The supply slit 33s is connected to the supply-side straightening portion 330. The supply-side straightening portion 330 has a function of diffusing the positive electrolyte solution supplied from the supply slit 33s along a lower edge portion of the bipolar plate 31. The discharge-side straightening portion 350 is a groove that is formed on one face side of the frame member 32 and extends along an inner-peripheral upper edge of the frame member 32. The discharge slit 35s is connected to the discharge-side straightening portion 350. The discharge-side straightening portion 350 has a function of gathering the positive electrolyte solution discharged from an upper edge portion of the bipolar plate 31 into the discharge slit 35s.

In this example, the supply-side straightening portion 330 and the discharge-side straightening portion 350 are formed on the frame member 32, but the supply-side straightening portion 330 and the discharge-side straightening portion 350 may alternatively be formed on the bipolar plate 31. If the supply-side straightening portion 330 is formed on the bipolar plate 31, a groove may be formed along the lower edge portion of the bipolar plate 31. Also, if the discharge-side straightening portion 350 is formed on the bipolar plate 31, a groove may be formed along the upper edge portion of the bipolar plate 31.

FIG. 4 only shows the supply-side straightening portion 330 and the discharge-side straightening portion 350 for the positive electrolyte solution that are formed on one end side, which is the positive electrode side, of the cell frame 3 on which the positive electrode 14 (see FIG. 3) is arranged. A supply-side straightening portion and a discharge-side straightening portion for the negative electrolyte solution are also formed on the other face side, which is the negative electrode side, of the cell frame 3 on which the negative electrode 15 (see FIG. 3) is arranged, similarly to the one face side. The configuration of the supply-side straightening portion and the discharge-side straightening portion for the negative electrolyte solution that are formed on the other face side of the cell frame 3 is the same as that of the supply-side straightening portion 330 and the discharge-side straightening portion 350 shown in FIG. 4, and therefore a description thereof is omitted.

Bipolar Plate

As shown in FIGS. 4 and 5, the bipolar plate 31 has a supply edge 311 to which the electrolyte solutions are supplied, and a discharge edge 312 from which the electrolyte solutions are discharged, in a plan view from a direction in which the positive electrode 14 (see FIG. 3) and the negative electrode 15 (see FIG. 3) overlap the bipolar plate 31. In this example, a lower peripheral edge of the bipolar plate 31 is the supply edge 311. An upper peripheral edge of the bipolar plate 31 is the discharge edge 312.

The planar shape of the bipolar plate 31 in this example is a rectangular shape. One face side of the bipolar plate 31 as viewed from the proximal side of FIGS. 4 and 5 is a face opposing the positive electrode 14 (see FIG. 3). The other face side of the bipolar plate 31 as viewed from the distal side of FIGS. 4 and 5 is a face opposing the negative electrode 15 (see FIG. 3).

Meandering Flow Path

As shown in FIG. 5, the battery cell 10 of this example includes the plurality of meandering flow paths 4. The meandering flow paths 4 are typically formed on the bipolar plate 31. The meandering flow paths 4 can alternatively be formed on at least either the positive electrode 14 or the negative electrode 15.

Each meandering flow path 4 is formed by a groove, for example. A porous body may be accommodated in the groove. If the meandering flow paths 4 are formed on an electrode, each meandering flow path 4 may be formed by a non-dense portion at which the porosity of the porous body itself that constitutes the electrode is locally large. In the aforementioned groove and the non-dense portion of the porous body at which the porosity is large, the electrolyte solution can more easily flow than in a portion without a groove and a dense portion at which the porosity is small.

As shown in FIG. 5, this example describes the case where the plurality of meandering flow paths 4 are formed on the bipolar plate 31, and each meandering flow path 4 is formed by a groove. It is relatively easy to form grooves in the bipolar plate 31. Thus, the meandering flow paths 4 formed by grooves can be easily formed in the bipolar plate 31. Further, the configuration in which each meandering flow path 4 includes a groove allows the electrolyte solution to more easily flow through the meandering flow path 4, and therefore, the pressure loss of the electrolyte solution can be easily reduced.

A configuration of the meandering flow paths 4 formed on the bipolar plate 31 shown in FIG. 5 will be described below. In the following description, the direction from the supply edge 311 toward the discharge edge 312 is regarded as a lengthwise direction. The direction parallel to the supply edge 311 and the discharge edge 312 is regarded as a widthwise direction. That is to say, the paper up-down direction in FIGS. 4 and 5 is the aforementioned lengthwise direction. The paper left-right direction in FIGS. 4 and 5 is the aforementioned widthwise direction. FIGS. 4 and 5 only show the plurality of meandering flow paths 4 that are provided on the positive electrode 14 side, which is one face side of the bipolar plate 31, and through which the positive electrolyte solution flows. The plurality of meandering flow paths through which the negative electrolyte solution flows are also provided on the negative electrode 15 side, which is the other face side of the bipolar plate 31, similarly to the one face side thereof. Note that FIGS. 4 and 5 show only two of the plurality of meandering flow paths 4, and omit the other meandering flow paths 4, which are indicated by " . . . (dots)".

As shown in FIG. 5, a plurality of meandering flow paths 4 are arranged in parallel in the widthwise direction. In this example, the meandering flow paths 4 are provided side by side throughout the bipolar plate 31. It is preferable to select the number of meandering flow paths 4 as appropriate depending on the size of the bipolar plate 31, typically the length in the widthwise direction of the bipolar plate 31, such that the electrolyte solution can be uniformly spread throughout the bipolar plate 31. Each meandering flow path 4 has an introduction port 4i that is in connection with the supply edge 311, and a discharge port 4o that is in connection with the discharge edge 312. Each meandering flow path 4 is serially formed from the introduction port 4i to the discharge port 4o.

A configuration of the meandering flow path 4 will be described in detail with reference to FIG. 6. As shown in FIG. 6, each meandering flow path 4 has an introduction-side section 41, a turn-back section 45, and a discharge-side section 42. The introduction-side section 41 extends from the introduction port 4i toward the discharge edge 312 side, and has an end portion 411 on the discharge edge 312 side. The end portion 411 on the discharge edge 312 side of the introduction-side section 41 does not reach the discharge edge 312, and is not in connection with the discharge edge 312. The turn-back section 45 turns back from the end portion 411 on the discharge edge 312 side of the introduction-side section 41 toward the supply edge 311 side, and has an end portion 451 on the supply edge 311 side. The end portion 451 on the supply edge 311 side of the turn-back section 45 does not reach the supply edge 311, and is not in connection with the supply edge 311. An end portion 452 on the discharge edge 312 side of the turn-back section 45 is connected to the end portion 411 of the introduction-side section 41. The discharge-side section 42 extends from the end portion 451 on the supply edge 311 side of the turn-back section 45 toward the discharge edge 312 side, and reaches the discharge port 4o. The discharge-side section 42 has an end portion 421 on the supply edge 311 side. The end portion 411 on the discharge edge 312 of the introduction-side section 41 and the end portion 421 on the supply edge 311 side of the discharge-side section 42 are in connection with each other via the turn-back section 45. Each meandering flow path 4 has a parallel arrangement region 4A in which the introduction-side section 41, the turn-back section 45, and the discharge-side section 42 are arranged in the widthwise direction. The parallel arrangement region 4A is a region in which the introduction-side section 41, the turn-back section 45, and the discharge-side section 42 overlap each other when the introduction-side section 41, the turn-back section 45, and the discharge-side section 42 are viewed in the widthwise direction. The introduction-side section 41, the turn-back section 45, and the discharge-side section 42 that constitute the meandering flow path 4 of this example are formed by grooves.

The introduction-side section 41 and the discharge-side section 42 are provided parallel to each other so as to extend in the lengthwise direction. The introduction-side section 41 and the discharge-side section 42 are formed so as to be located, partially next to each other in the widthwise direction. Specifically, a portion of the introduction-side section 41 from a region near the introduction port 4i to the end portion 411 and a portion of the discharge-side section 42 from a region near the discharge-side section 4o to the end portion 421 are located next to each other in the widthwise direction.

The turn-back section 45 shown in FIG. 6 is provided so as to extend mainly in the lengthwise direction. Specifically, the turn-back section 45 is constituted by one vertical section 52 that extends in the lengthwise direction, and two lateral sections 53 that extend in the widthwise direction. The vertical section 52 is provided parallel to the introduction-side section 41 and the discharge-side section 42, and is arranged between the introduction-side section 41 and the discharge-side section 42. The lateral sections 53 are provided at end portions on the discharge edge 312 side and the supply edge 311 side of the vertical section 52. An end portion on the discharge edge 312 side of the vertical section 52 is connected to the end portion 411 of the introduction-side section 41 via the lateral section 53, and an end portion on the supply edge 311 of the vertical section 52 is connected to the end portion 421 of the discharge-side section 42 via the lateral section 53.

Effects of Meandering Flow Path

A flow of an electrolyte solution in the case where the meandering flow paths 4 are provided will be described. An electrolyte solution supplied from the supply edge 311, such as the positive electrolyte solution, is introduced from the introduction port 4i into each meandering flow path 4. The electrolyte solution introduced into each meandering flow path 4 flows along the meandering flow path 4, and is discharged from the discharge port 4o to the discharge edge 312.

The electrolyte solution flowing through the meandering flow paths 4 permeates from the meandering flow paths 4 through an electrode facing the meandering flow paths 4, such as the positive electrode 14, and diffuses from a surface of the electrode into the electrode. The diffusion of the electrolyte solution into the electrode enables the electrolyte solution to flow within the electrode. As a result of the electrolyte solution flowing in the electrode, the battery reaction occurs in the electrode.

Cross-Sectional Area of Meandering Flow Path

The meandering flow path 4 shown in FIG. 6 has a uniform cross-sectional area over the entire length from the introduction port 4i to the discharge port 4o. The "cross-sectional area of the meandering flow path 4" refers to the cross-sectional area of a lateral cross-section of the meandering flow path 4 that is orthogonal to the direction in which the electrolyte solution flows. The "cross-sectional area being uniform" has the following meaning. A plurality of portions are selected along the meandering flow path 4, and the cross-sectional area of each of the plurality of portions of the meandering flow path 4 is measured. Specifically, the cross-sectional area of each of the plurality of portions in the introduction-side section 41, the turn-back section 45, and the discharge-side section 42 is measured. It is favorable that the number of portions at which the measurement is performed is 10 or more in each section, that is, 30 or more in total, and that these portions are set at equal intervals. Then, an average value of the measured cross-sectional areas is obtained, and the cross-sectional area is regarded as being uniform when the cross-sectional areas at the respective portions are ±30% of the average value. More preferably, the cross-sectional area is regarded as being uniform if the cross-sectional areas at the respective portions are ±20% of the average value, and more preferably ±10%.

The cross-sectional areas of the introduction-side section 41, the turn-back section 45, and the discharge-side section 42 that constitute the meandering flow path 4 may be, for example, 0.5 mm² or more and 16 mm² or less, and furthermore, 1 mm² or more and 12 mm² or less. As a result of the cross-sectional area of the meandering flow path 4 being in the above range, the flow rate of the electrolyte solution flowing through the meandering flow path 4 can be easily secured sufficiently. Accordingly, if the cross-sectional area of the meandering flow path 4 is in the above range, the electrolyte solution can be easily spread over a wide area of the electrode, and thus, the battery reaction can be easily caused in the electrode. Further, if the cross-sectional area of the meandering flow path 4 is in the above range, the flow resistance of the electrolyte solution in the meandering flow path 4 can be reduced, and thus, the pressure loss of the electrolyte solution can be easily reduced.

In this example, the cross-sectional shape of the meandering flow path 4 is a rectangular shape. The "cross-sectional shape of the meandering flow path 4" refers to the shape of the aforementioned lateral cross-section. The cross-sectional shape of the meandering flow path 4 is not limited to a rectangular shape, and may alternatively be, for example, a triangular shape, a trapezoidal shape, a semicircular shape, a semi-oval shape, or the like. The width and the depth of the meandering flow path 4 are uniform over the entire length from the introduction port 4i to the discharge port 4o. The "width of the meandering flow path 4" refers to the width in the aforementioned lateral cross-section. The depth of the meandering flow path 4 refers to the depth in the aforementioned lateral cross-section. The width of the meandering flow path 4 may be, for example, 0.5 mm or more and 10 mm or less, and furthermore, 1 mm or more and 5 mm or less. The depth of the meandering flow path 4 may be, for example, 0.5 mm or more and 6 mm or less, and furthermore, 1 mm or more and 4 mm or less.

Entire Length of Meandering Flow Path

The entire length of the meandering flow path 4 may be, for example, 300 mm or more and 6000 mm or less, and furthermore, 450 mm or more and 4800 mm or less. The "entire length of the meandering flow path 4" means the length along a center line from the introduction port 4i to the discharge port 4o. If the entire length of the meandering flow path 4 is too short, the electrolyte solution is unlikely to diffuse from the meandering flow path 4 into the electrode. As a result, the electrolyte solution does not sufficiently flow through the electrode, and there is a concern that the electrolyte solution passes through the meandering flow path 4 without reacting. Since the entire length of the meandering flow path 4 is 300 mm or more, the electrolyte solution can easily diffuse sufficiently from the meandering flow path 4 into the electrode. For this reason, the electrolyte solution can be easily enabled to flow within the electrode. Accordingly, if the entire length of the meandering flow path 4 is 300 mm or more, the electrolyte solution can be easily enabled to diffuse into a wide area of the electrode, and thus, the battery reaction can be easily caused in the electrode. Since the entire length of the meandering flow path is 6000 mm or less, it is possible to avoid an excessive increase in the flow resistance of the electrolyte solution in the meandering flow path 4. Accordingly, if the entire length of the meandering flow path 4 is 6000 mm or less, the flow resistance of the electrolyte solution in the meandering flow path 4 can be sufficiently reduced, and thus, the pressure loss of the electrolyte solution can be easily reduced sufficiently.

Length of Parallel Arrangement Region

The length of the parallel arrangement region 4A in the meandering flow path 4, that is, the length $L_{4A}$ shown in FIG. 6 may be, for example, 100 mm or more and 2000 mm or less, and furthermore, 150 mm or more 1600 mm or less. In other words, it can be said that the length of the parallel arrangement region 4A corresponds to the length in the lengthwise direction of the turn-back section 45, that is, the length of the vertical section 52. The aforementioned length of the turn-back section 45 refers to the distance in the lengthwise direction between a portion of the turn-back section 45 that is closest to the discharge edge 312 and a portion thereof that is closest to the supply edge 311. In this example, the length of the parallel arrangement region 4A is equal to the distance in the lengthwise direction between the end portion 411 of the introduction-side section 41 and the end portion 421 of the discharge-side section 42. Since the length of the parallel arrangement region 4A is 100 mm or more, the electrolyte solution can be easily diffused into a wide area of the electrode, and thus, the battery reaction can be easily caused in the electrode. Since the length of the parallel arrangement region 4A is 2000 mm or less, an excessive increase in the entire length of the meandering flow path 4 can be avoided. Accordingly, if the length of the parallel arrangement region 4A is 2000 mm or less, the flow resistance of the electrolyte solution in the meandering flow path can be reduced, and thus, the pressure loss of the electrolyte solution can be easily reduced.

The proportion of the length of the parallel arrangement region 4A to the length of the bipolar plate 31 is may be, for example, 60% or more, and furthermore, 70% or more, or 80% or more. The length of the bipolar plate 31 refers to the distance in the lengthwise direction from the supply edge 311 to the discharge edge 312. Since the proportion of the length of the parallel arrangement region 4A to the length of the bipolar plate 31 is 60% or more, the electrolyte solution can be easily diffused into a wide area of the electrode, and the battery reaction can be easily caused over the entire region of the electrode. When the battery cell 10 (see FIG. 3) is formed, the proportion of the parallel arrangement region 4A to the length of at least either the positive electrode 14 or the negative electrode 15 may be, for example, 60% or more, and furthermore, 70% or more, or 80% or more.

The distance from the end portion 411 on the discharge edge 312 side of the introduction-side section 41 to the discharge edge 312 may be, for example, 1 mm or more and 150 mm or less, and furthermore, 2 mm or more and 100 mm or less, or 4 mm or more and 80 mm or less. The distance from the end portion 421 on the supply edge 311 side of the discharge-side section 42 to the supply edge 311 may be, for example, 1 mm or more and 150 mm or less, and furthermore, 2 mm or more and 100 mm or less, or 4 mm or more and 80 mm or less.

Distance between Introduction-side Section and Turn-back Section and Distance Between Discharge-side Section and Turn-back Section The distance in the widthwise direction between the introduction-side section 41 and the turn-back section 45 and the distance in the widthwise direction between the discharge-side section 42 and the turn-back section 45 may be, for example, 1 mm or more and 36 mm or less, and furthermore, 2 mm or more and 20 mm or less. This configuration can improve the diffusion of the electrolyte solution into the electrode. The "distance between the introduction-side section 41 and the turn-back section 45" means the interval between the center line of the introduction-side section 41 and the center line of the vertical section 52 in the turn-back section 45. The "distance between the discharge-side section 42 and the turn-back section 45" means the interval between the center line of the discharge-side section 42 and the center line of the vertical section 52 in the turn-back section 45. The distance between the introduction-side section 41 and the turn-back section 45 and the distance between the discharge-side section 42 and the turn-back section 45 are, respectively, the lengths denoted by $P_{11}$ and $P_{12}$ in FIG. 6. The "center line of the introduction-side section 41" refers to a line that passes through the center of the width of the introduction-side section 41. The "center line of the vertical section 52 in the turn-back section 45" refers to a line that passes through the center of the width of the vertical section 52. The "center line of the discharge-side section 42" refers to a line that passes through the center of the width of the discharge-side section 42. In FIG. 6, the center line of the introduction-side section 41, the center line of the vertical section 52 in the turn-back section 45, and the center line of the discharge-side section 42 are indicated by one-dot chain lines.

Since the distance $P_{11}$ between the introduction-side section 41 and the turn-back section 45 and the distance $P_{12}$ between the discharge-side section 42 and the turn-back section 45 are each 1 mm or more, the area of portions (so-called rib portions) located between the introduction-side section 41 and the turn-back section 45 and between the discharge-side section 42 and the turn-back section 45 increases. For this reason, the contact area between the electrode and the bipolar plate 31 can be easily secured. Accordingly, if each of the aforementioned distances $P_{11}$ and $P_{12}$ is 1 mm or more, the battery reaction can be efficiently caused. Further, since each of the aforementioned distances $P_{11}$ and $P_{12}$ is 36 mm or less, the electrolyte solution sufficiently diffuses from the meandering flow path 4 into the electrode, and the battery reaction can be easily caused sufficiently over the entire region of the electrode. Accordingly, if each of the aforementioned distances $P_{11}$ and $P_{12}$ is 36 mm or less, the battery reaction can be efficiently caused.

Effects of Embodiment

Since the bipolar plate 31 in the battery cell 10 according to the embodiment has the plurality of meandering flow paths 4, the electrolyte solution can be enabled to flow over a wide area of the electrode along each meandering flow paths 4. Since the battery cell 10 has the plurality of meandering flow paths 4, the pressure loss of the electrolyte solution can be reduced. Accordingly, the battery cell 10 can reduce the pump power of the RF batter 1.

Furthermore, since the length of the parallel arrangement region 4A in the meandering flow path 4 is 100 mm or more and 2000 mm or less, the electrolyte solution can be easily diffused into a wide area of the electrode while reducing the pressure loss of the electrolyte solution.

Since the cell stack 2 according to the embodiment includes the above battery cell 10, the pump power of the RF batter 1 can be reduced. Accordingly, the cell stack 2 can improve battery performance of the RF battery 1.

Since the RF battery 1 according to the embodiment includes the above battery cell 10 or cell stack 2, the RF batter 1 has low pump power and excellent battery performance.

Variation

The above embodiment has described a configuration in which the introduction-side section 41, the turn-back section 45, and the discharge-side section 42 are provided parallel to each other along the lengthwise direction as shown in FIG. 6, but a configuration may alternatively be employed in which these sections are inclined in the same direction with respect to the lengthwise direction.

LIST OF REFERENCE NUMERALS

1 Redox flow battery (RF battery)
2 Cell stack
10 Battery cell
11 Membrane
12 Positive electrode cell
13 Negative electrode cell
14 Positive electrode
15 Negative electrode
3 Cell Frame 31 Bipolar plate
311 Supply edge
312 Discharge edge
32 Frame member
32o Recessed portion
33, 34 Supply manifold
35, 36 Discharge manifold
33s, 34s Supply slit
35s, 36s Discharge slit
37 Seal member
330 Supply-side straightening portion
350 Discharge-side straightening portion
4 Meandering flow path
4i Introduction port
4o Discharge port
4A Parallel arrangement region
41 Introduction-side section
42 Discharge-side section
411, 421 End portion
45 Turn-back section
451, 452 End portion
52 Vertical section
53 Lateral section
100P Positive electrode circulation path
100N Negative electrode circulation path
106 Positive electrolyte solution tank
107 Negative electrolyte solution tank
108, 109 Supply pipe
110, 111 Return pipe
112, 113 Pump
200 Sub stack
210 Supply/discharge plate
220 End plate
230 Tightening mechanism
80 AC-DC converter
90 Power grid
$L_{4A}$ Length
$P_{11}$, $P_{12}$ Distance

The invention claimed is:

1. A battery cell comprising:
   an electrode;
   a bipolar plate arranged opposing the electrode;
   a supply edge to which an electrolyte solution is supplied;
   a discharge edge from which the electrolyte solution is discharged, the supply edge and the discharge edge being in a plan view from a direction in which the electrode and the bipolar plate overlap each other;
   a frame member located around the bipolar plate and having on an inner periphery of the frame member;
     a supply-side straightening portion extending along the supply edge; and
     a discharge-side straightening portion extending along the discharge edge; and
   a plurality of meandering flow paths each of which has an introduction port that is in connection with the supply edge, and a discharge port that is in connection with the discharge edge, and is serially disposed from the introduction port to the discharge port, the plurality of meandering flow paths being arranged in parallel in a widthwise direction, each of the meandering flow paths having:
     an introduction-side section extending from the introduction port toward a discharge edge side, and having an end portion on the discharge edge side;
     a turn-back section that is turned back from the end portion on the discharge edge side of the introduction-side section toward a supply edge side, and has an end portion on the supply edge side; and
     a discharge-side section extending from the end portion on the supply edge side of the turn-back section toward the discharge edge side, and reaching the discharge port,
   wherein a length in a lengthwise direction of a region in which the introduction-side section, the turn-back section, and the discharge-side section are arranged in the widthwise direction is 100 mm or more and 2000 mm or less, and the lengthwise direction is a direction from the supply edge toward the discharge edge, and the widthwise direction is a direction parallel to the supply edge and the discharge edge.

2. The battery cell according to claim 1, wherein a distance in the widthwise direction between the introduction-side section and the turn-back section and a distance in the widthwise direction between the discharge-side section and the turn-back section are each 1 mm or more and 36 mm or less.

3. The battery cell according to claim 1, wherein a cross-sectional area of each of the meandering flow paths is uniform over an entire length from the introduction port to the discharge port.

4. The battery cell according to claim 1, wherein a cross-sectional area of each of the meandering flow paths is 0.5 mm$^2$ or more and 16 mm$^2$ or less.

5. The battery cell according to claim 1, wherein an entire length of each of the meandering flow paths is 300 mm or more and 6000 mm or less.

6. The battery cell according to claim 1, wherein the meandering flow paths are disposed on the bipolar plate.

7. The battery cell according to claim 1, wherein each of the meandering flow paths includes a groove.

8. The battery cell according to claim 1, wherein a permeability of the electrode is $1\times10^{-13}$ m$^2$ or more and $1\times10^{-10}$ m$^2$ or less.

9. The battery cell according to claim 1, wherein the turn-back section has:
   one vertical section arranged between the introduction-side section and the discharge-side section; and
   two lateral sections, one of the two lateral sections connecting end portions on the discharge edge side of the introduction-side section and of the vertical section to each other, and the other one of the two lateral sections connecting end portions on the supply edge side of the discharge-side section and of the vertical section to each other.

10. A cell stack comprising the battery cell according to claim 1.

11. A redox flow battery comprising the cell stack according to claim 10.

12. A redox flow battery comprising the battery cell according to claim 1.

* * * * *